March 25, 1941. A. O. BATES 2,236,327
METAL WORKING TOOL FORMING ATTACHMENT FOR LATHES
Filed Sept. 8, 1939 3 Sheets-Sheet 1
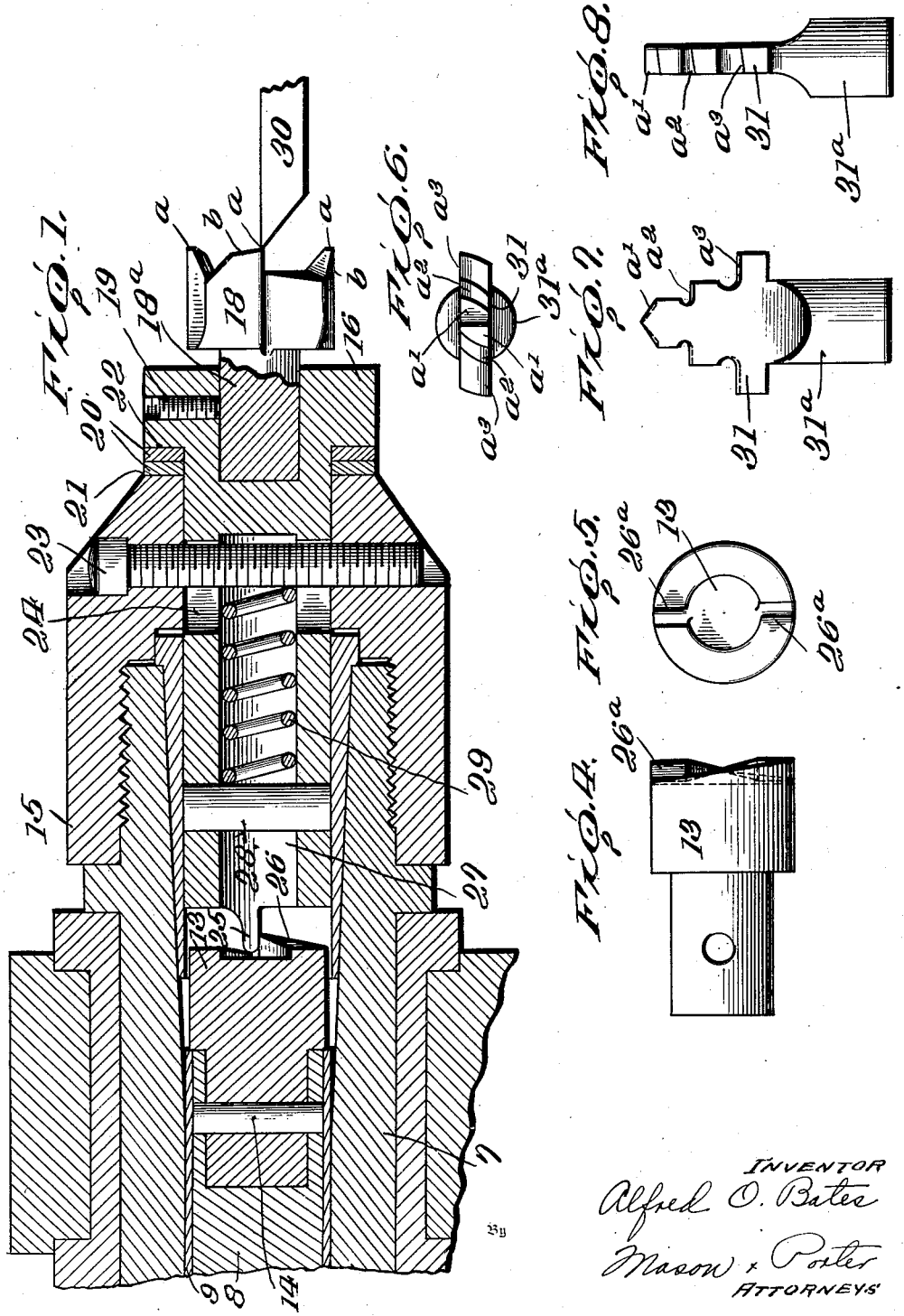
INVENTOR
Alfred O. Bates
Mason & Porter
ATTORNEYS

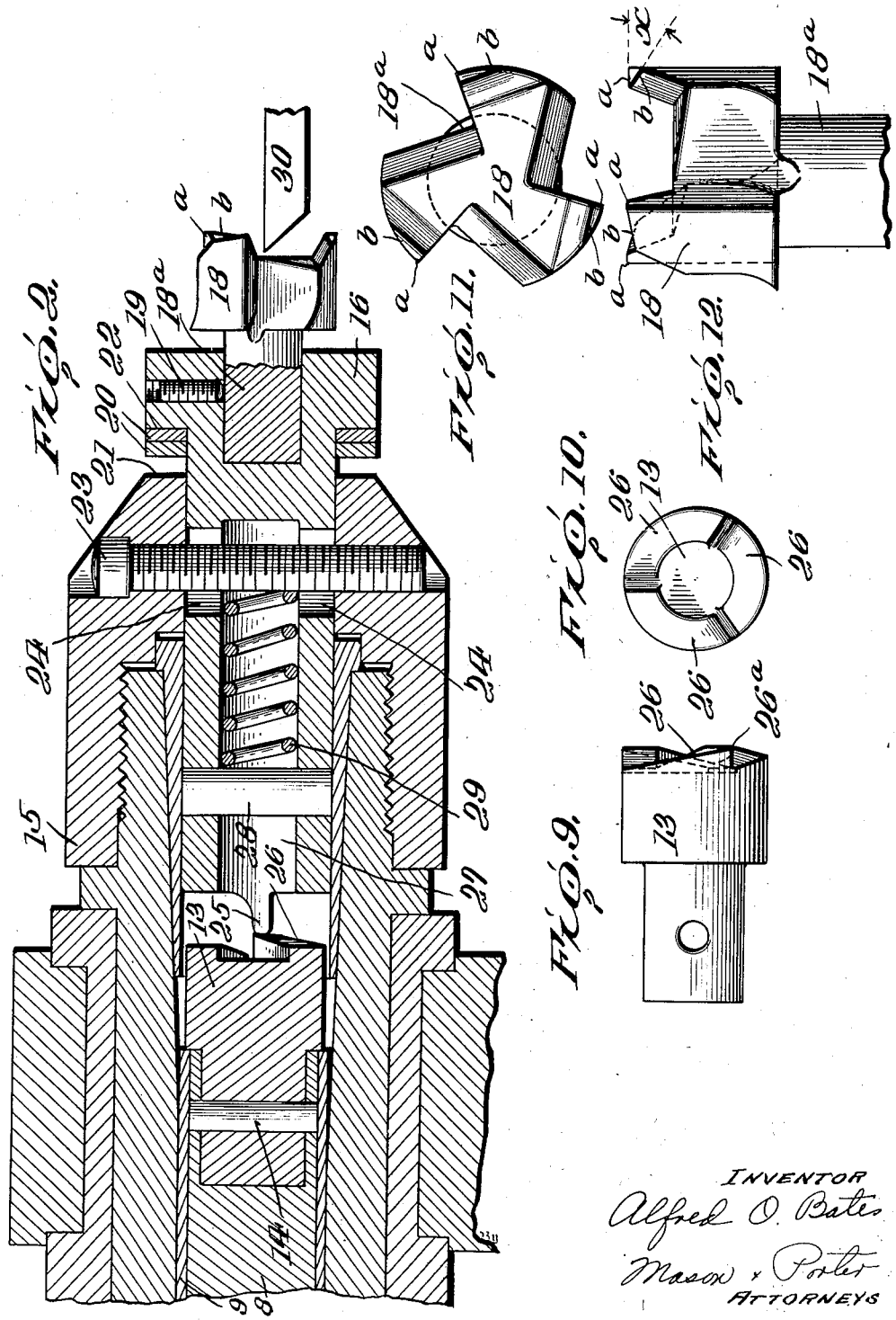

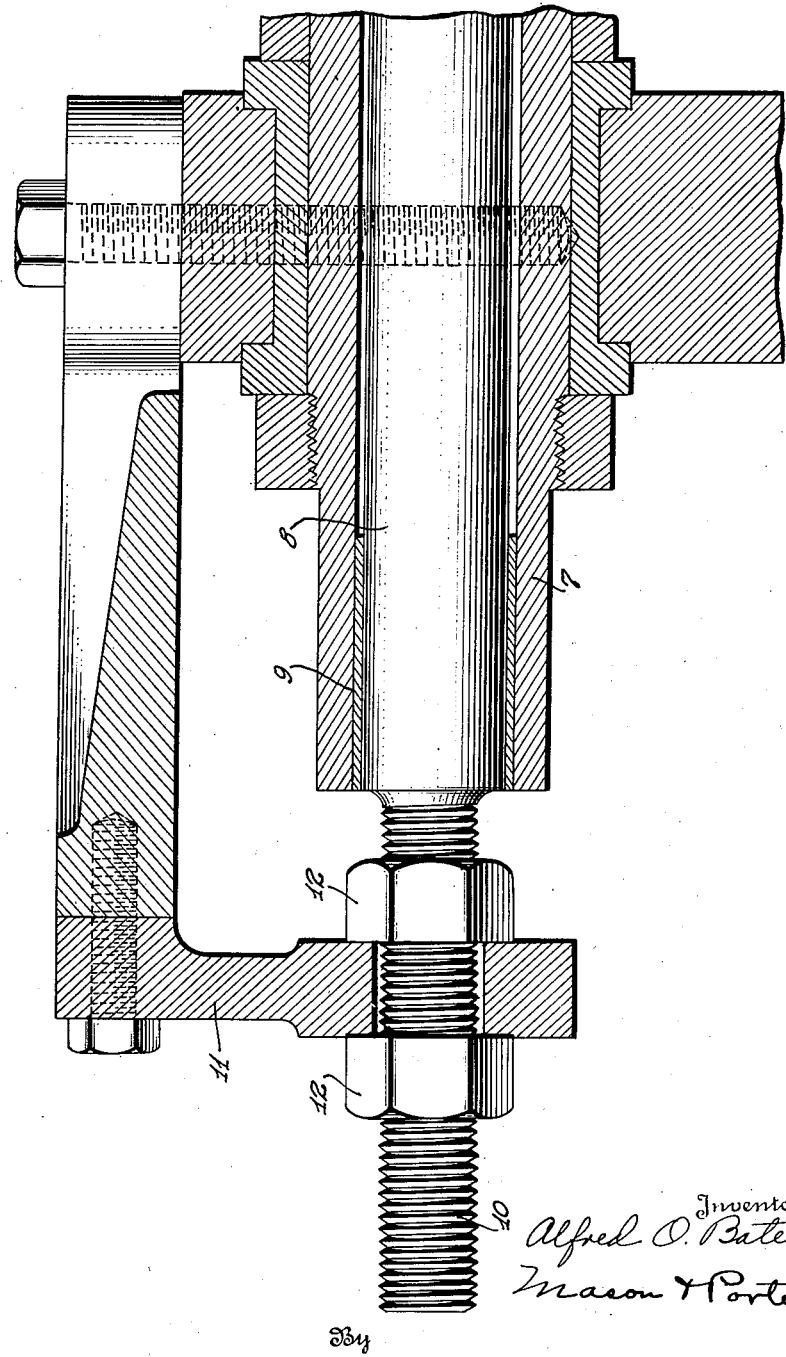

Patented Mar. 25, 1941

2,236,327

UNITED STATES PATENT OFFICE 2,236,327

METAL WORKING TOOL FORMING ATTACHMENT FOR LATHES

Alfred O. Bates, Cleveland Heights, Ohio, assignor to Arthur L. Parker, Cleveland, Ohio Application September 8, 1939, Serial No. 294,015

5 Claims. (Cl. 82—11)

For many production machining operations it is a common practice to make special metal working tools that will shape the work piece to the desired irregular shape in one operation. The present invention relates to an apparatus for shaping the cutting face on metal working tools used for the purpose stated.

An object of the invention is to provide an attachment for lathes which includes a cam-controlled mechanism for rotating a metal working tool and for moving the same endwise during the forming of the cutting faces by a stationary cutting tool, whereby the shape of the cutting face is determined by the control cam.

In the drawings which show by way of illustration one embodiment of the invention—

Figure 1 is a sectional view through the headstock of a conventional lathe showing the improvement applied thereto, and with the supporting chuck for the metal working tool moved to its extreme inner position;

Fig. 2 is a similar view showing the chuck moved to its extreme outer position;

Fig. 3 is a view partly in section of the rear end of the headstock of the lathe, showing the means for mounting the spindle so that it may be adjusted and is held from rotation;

Figures 4 and 5 are side and front views, respectively, of a control cam forming a part of the present invention;

Figures 6, 7 and 8 are top, front and side views, respectively, of a tool, the forming face of which was shaped by the control cam of Figures 4 and 5;

Figures 9 and 10 are side and front views, respectively, of another form of control cam for shaping the cutting face of a metal working tool; and Figures 11 and 12 are top and side views, respectively, of a tool of fluted cylindrical form, the cutting face of which is shaped by the control cam of Figures 9 and 10.

The invention broadly resides in an apparatus which may be attached to the conventional lathe for supporting and moving a metal working tool during the shaping of the cutting face thereof. The apparatus includes a stationary spindle which is mounted in the headstock of the lathe, and which may be shifted to different set positions longitudinally of the headstock. This stationary spindle carries a stationary control cam. Mounted in the headstock is a sleeve which is rotated about the longitudinal axis of the spindle. This sleeve carries a collet which is fixedly attached thereto, and the collet supports a chuck in which the tool to be shaped is detachably secured. The chuck is mounted in the collet so that it rotates therewith and is free to have a limited endwise movement. A spring moves the chuck to its innermost position which is limited by a stop, and the control cam which is fixed to the spindle moves the chuck outwardly so that during each rotation of the chuck it will be moved endwise as the tool which is being shaped is presented to a stationary cutting tool and a face formed on the metal working tool which is determined by the control cam.

Referring more in detail to the drawings, there is shown the headstock of a conventional lathe. Mounted for rotation in the headstock is a sleeve 7 and mounted within the sleeve 7 is a spindle 8. Between the sleeve and the spindle are suitable bushings 9, 9. The spindle is fixedly mounted against rotation. As shown, this is accomplished by means of a bracket 11 which has a bored opening for receiving the spindle 8. The spindle 8 is threaded as indicated at 10 and has lock nuts 12, 12 mounted thereon to bear against the side faces of the bracket. The lock nuts may be turned against the side faces of the bracket 11 to hold the spindle fixed in a set position. If it is desired to adjust the position of the spindle, this can be readily done by loosening the nuts and shifting the spindle endwise. The spindle terminates short of the end of the sleeve 7, and secured to the inner end of the spindle 8 is a control cam 13. Said cam has a shank which fits within the socket in the end of the spindle, and the control cam is secured to the spindle by the pin 14. The spindle can be easily removed and the cam detached and replaced by another cam whenever desired.

Mounted on the end of the rotatable sleeve 7 is a collet 15. Said collet, as shown, has a threaded connection with the end of the sleeve. Mounted in the collet 15 is the chuck 16. Said chuck is provided with a shank which extends through the collet 15 and into the sleeve 7. There is a slot 24 through the shank of the chuck and a bolt 23 is threaded into the collet and extends through this slot 24. This is an elongated slot of greater length than the diameter of the bolt 23 so that the chuck has a limited longitudinal movement in the collet 15. The bolt 23 thus serves as a retaining member to prevent withdrawal of the chuck 16 from the collet 15, and also provides the only direct mechanically driven link between the rotating collet 15 and the rotated chuck 16. One or more leather washers 20, 21 may be provided between the outer end of the collet 15 and the chuck shoulder adjacent the same. The shank of the chuck has a bore centrally thereof, and located in the bore is a spring 29. This spring at one end bears against the bolt 23 and at its other end bears against a pin 28, and serves to constantly urge the chuck inwardly. The chuck has a cam follower lip 25 which projects from the inner end thereof and is adapted to engage the face 26 of the control cam 13, the cam surface 26 serving as a stop to limit the inward movement of the chuck 16.

The chuck 16 is provided with a socket to receive the shank of the metal working tool 18, the cutting face of which is to be shaped on the attachment. The shank 18a of the cutting tool fits in the socket in the chuck and is secured therein by set screws, one of which is indicated at 19.

In Figure 1 of the drawings a metal working tool is shown which is of the construction shown in Figures 11 and 12. This tool may be referred to as of fluted cylindrical form. It has cutting edges $a$, three in number. The land or stock $b$ behind the cutting edge must be relieved or cut back in order to permit the tool to function properly. The angle of relief of this cut back edge is indicated in Figure 12 at $x$. The purpose of this cam-controlled mechanism is to shape this cutting face, that is, to cut the stock or land in rear of the respective cutting edges of the tool. This is accomplished by the control cam 13 which moves the chuck endwise as the work piece is presented to the stationary cutting tool 30. The cam face 26 is cut away from the high point 26a at the same angle $x$ as the stock or land is to be cut away.

In Figure 1 of the drawings, it will be noted that lip 25 has just dropped from the high point to the low point of the cam and is immediately starting to travel to the right or outward on the surface 26, while the tool bit 30 is just ready to contact the metal working tool 18 at point $a$. As the tool 18 rotates it keeps traveling outwardly until the next step in the cam, 120° away, is reached. It then drops back and the next flute is in position to be contacted at the point $a$ by the tool bit 30. Although the metal working tool 18 is traveling outwardly during the entire 120° of rotation, it is operated upon by the tool bit 30 for only a portion of this time, the tool bit 30 being out of contact with the metal working tool while it traverses the flute. This may best be seen in Figure 2 which shows the relative positions of the parts when the lip 25 is on the highest point of the cam almost ready to drop to the lowest.

With the cams and other cooperating parts designed as shown, the chuck is positively controlled by the cam at all times. From the moment the lip 25 drops to the low point on the cam face 26 it immediately moves gradually outward until it reaches the high point of the cam face. It then drops off to the next low point and moves outwardly again. The parts are properly registered when the metal working tool 18 is traveling outwardly at the time that the surface $a$—$b$ is presented to the tool bit 30. Since the duration of the outward movement is longer than the actual contact time of the tool 18, the parts can be registered so that the tool 18 contacts at point $a$ at any time from the beginning to approximately the middle of the outward movement.

In Figures 7 and 8, there is shown a forming tool 31 for shaping in one operation irregular work pieces wherein there are cutting edges $a^1$, $a^2$ and $a^3$. This cutting tool has a shank 31a which is inserted in the socket 17 of the chuck 16 and the tool is secured by the set screw 19. The control cam 13 is provided with two cam controlling faces 26a, 26a. In the operation of the cutting faces of the metal working tool 31, the control cam moves the tool which is being cut forward on to the stationary cutting tool 30 so as to properly shape the cutting faces. Although not shown in the drawings, the tool 30 is mounted on a compound in the same conventional manner as the cutting tool of a lathe is mounted. The compound is adjustable both transversely and longitudinally of the lathe bed, and therefore, the tool bit 30 can be readily shifted in a horizontal direction. Vertically the cutting edge is held at approximately the center of rotation. In cutting the three-step tool shown in Figure 7, the tool bit 30 is positioned first for cutting the surface $a^1$, then for $a^2$ and lastly for $a^3$.

It is obvious that by changing the cam 13 a metal working tool may be produced for giving a desired irregular shape to a work piece. It is also obvious that many changes in the details of construction and arrangement of the parts may be made without departing from the spirit of the invention as set forth in the appended claims. While the invention is described in connection with the forming of a metal working tool, it will be understood that this mechanism may be used for re-conditioning or sharpening tools.

Having thus described the invention, what I claim as new and desire to secure by Letters Patent, is—

1. A machine for forming the cutting face of a metal working tool comprising a stationary cutting tool and means for presenting said metal working tool to the stationary cutting tool including a chuck in which the metal working tool is mounted, a rotatable sleeve on which said chuck is mounted for rotation and movement longitudinally of the axis of the sleeve, a stationary spindle mounted within said sleeve, a control cam carried by said spindle, a follower lip carried by the chuck and engaging said control cam, and a spring for moving said chuck so as to maintain said follower lip in contact with the cam.

2. A machine for forming the cutting face of a metal working tool comprising a stationary cutting tool and means for presenting said metal working tool to the stationary cutting tool including a chuck in which said metal working tool is mounted, a sleeve, a collet carried by said sleeve in which said chuck is mounted for rotation with the collet and for endwise movement in the collet, means for rotating said sleeve, a stationary spindle mounted in said sleeve, a control cam fixed to said spindle, said chuck having a follower lip adapted to engage said control cam, said chuck having a bore centrally thereof at its inner end, a spring located in said bore, an abutment means carried by the chuck against which one end of the abutment spring bears, an abutment means carried by the collet against which the other end of the spring bears for moving the chuck inward to hold the follower lip in contact with the control cam.

3. A machine for forming the cutting face of a metal working tool comprising a stationary cutting tool and means for presenting said metal working tool to the stationary cutting tool including a chuck in which said metal working tool is mounted, a sleeve, a collet carried by said sleeve in which said chuck is mounted for rotation with the collet and for endwise movement in the collet, means for rotating said sleeve, a stationary spindle mounted in said sleeve, a control cam fixed to said spindle, said chuck having a follower lip adapted to engage said control cam, said chuck having a bore centrally thereof at its inner end, a spring located in said bore, an abutment means carried by the chuck against which one end of the abutment spring bears, an abutment means carried by the collet against which the other end of the spring bears for moving the chuck inward to hold the follower lip in contact with the control cam, and means for adjusting the spindle longitudinally in the sleeve and for holding said spindle in a set position.

4. A machine for forming the cutting face of a metal working tool comprising a stationary cutting tool and means for presenting said metal working tool to the stationary cutting tool including a rotatable sleeve, a stationary spindle mounted in said sleeve, a control cam detachably connected to the inner end of said spindle and held from rotation thereby, a chuck carried by said sleeve, means for rotating said chuck with said sleeve and for permitting longitudinal movement of the chuck in the sleeve, a follower lip carried by said chuck adapted to engage said control cam, and spring means for holding said follower lip in contact with the control cam.

5. A machine for forming the cutting face of a metal working tool comprising a stationary cutting tool and means for presenting said metal working tool to said stationary cutting tool including a chuck in which the machine tool is mounted, a rotatable sleeve on which the chuck is mounted for rotation with the sleeve and for endwise movement in the sleeve, a stationary cam disposed within the sleeve, a follower lip carried by the chuck and engaging the control cam, and a spring for moving the chuck to maintain the follower lip in contact with the cam.

ALFRED O. BATES.